(12) United States Patent
Dormanns et al.

(10) Patent No.: US 10,940,894 B2
(45) Date of Patent: Mar. 9, 2021

(54) SELF-SUPPORTING CARRIER STRUCTURE FOR AN INSTRUMENT PANEL IN A VEHICLE, INSTRUMENT PANEL COMPRISING SUCH A CARRIER STRUCTURE AND VEHICLE WITH SUCH AN INSTRUMENT PANEL

(71) Applicants: MOTHERSON INNOVATIONS COMPANY LIMITED, London (GB); VOLKSWAGEN AKTIENGESELLSCHAFT, Wolfsburg (DE)

(72) Inventors: Jan Dormanns, Waldkirch (DE); Torsten Weingärtner, Freiburg Im Breisgau (DE); Yann Buchet, Strasbourg (FR); Uwe Lüsebrink, Freiburg (DE); Romeo Wieczorek, Esslingen (DE); Simone Wilsdorf, Wolfsburg (DE); Miodrag Conic, Braunschweig (DE)

(73) Assignees: MOTHERSON INNOVATIONS COMPANY LIMITED, London (GB); VOLKSWAGEN AKTIENGESELLSCHAFT, Wolfsburg (DE)

( * ) Notice: Subject to any disclaimer, the term of this patent is extended or adjusted under 35 U.S.C. 154(b) by 141 days.

(21) Appl. No.: 16/242,540

(22) Filed: Jan. 8, 2019

(65) Prior Publication Data
US 2019/0210464 A1    Jul. 11, 2019

(30) Foreign Application Priority Data
Jan. 9, 2018 (EP) .................................. 18150714

(51) Int. Cl.
*B62D 25/14* (2006.01)
*B60H 1/00* (2006.01)
*B60K 37/02* (2006.01)

(52) U.S. Cl.
CPC ....... *B62D 25/145* (2013.01); *B60H 1/00564* (2013.01); *B60K 37/02* (2013.01); *B62D 25/142* (2013.01)

(58) Field of Classification Search
CPC .... B62D 25/14; B62D 25/145; B62D 25/142; H60H 1/00564
(Continued)

(56) References Cited

U.S. PATENT DOCUMENTS 5,873,780 A * 2/1999 Mori ..................... F24F 1/0057
454/285
5,934,744 A * 8/1999 Jergens ................ B62D 25/145
296/192

(Continued)

FOREIGN PATENT DOCUMENTS

DE 102008011697 A1 * 9/2009 ........... B60R 21/215
EP 0 654 395 A1 5/1995
(Continued)

OTHER PUBLICATIONS

European Search Report dated Aug. 7, 2018 with respect to counterpart European patent application 18150714.6.

*Primary Examiner* — Dennis H Pedder
(74) *Attorney, Agent, or Firm* — Ursula B. Day, Esq.

(57) ABSTRACT

The present invention relates to a self-supporting carrier structure for an instrument panel in a vehicle, comprising a network of a plurality of hollow support elements and solid support elements arranged according to the results of a load path analysis, wherein the hollow support elements form at least one manifold used as an air duct comprising at least one air inlet for introducing air into the hollow support elements
(Continued)

and at least one air outlet for guiding the air into a passenger compartment of a vehicle. Furthermore, the invention is directed to an instrument panel comprising such a carrier structure and is directed to a vehicle equipped with such an instrument panel.

16 Claims, 4 Drawing Sheets

(58) Field of Classification Search
USPC .................................................. 454/141, 142
See application file for complete search history.

(56) References Cited

U.S. PATENT DOCUMENTS

| | | | | |
|---|---|---|---|---|
| 6,155,631 A * | 12/2000 | Yoshinaka | ............ | B62D 25/142 296/1.03 |
| 6,203,092 B1 * | 3/2001 | Yoshinaka | ............ | B62D 25/142 296/70 |
| 6,250,678 B1 * | 6/2001 | Yoshinaka | ............ | B60H 1/0055 280/752 |
| 6,305,733 B1 * | 10/2001 | Rahmstorf | ............ | B62D 25/142 296/70 |
| 6,502,897 B2 * | 1/2003 | Neuss | ............ | B62D 25/142 296/208 |
| 6,582,011 B2 * | 6/2003 | Palazzolo | ............ | B60H 1/0055 296/208 |
| 6,802,559 B2 * | 10/2004 | Yoshihara | ............ | B62D 25/142 296/208 |
| 6,955,394 B1 * | 10/2005 | Reddig | ............ | B62D 25/142 296/193.02 |
| 10,308,202 B2 * | 6/2019 | Wunderlich | ............ | B60R 21/205 |
| 2002/0030386 A1 * | 3/2002 | Neuss | ............ | B62D 29/001 296/208 |
| 2002/0038965 A1 * | 4/2002 | Palazzolo | ............ | B62D 25/145 296/208 |
| 2003/0155793 A1 * | 8/2003 | Yoshihara | ............ | B62D 25/142 296/208 |
| 2004/0108744 A1 * | 6/2004 | Scheib | ............ | B62D 25/142 296/70 |
| 2004/0145208 A1 * | 7/2004 | Kapteyn | ............ | B60K 37/04 296/70 |
| 2004/0150251 A1 * | 8/2004 | Matsutani | ............ | B62D 25/142 296/193.02 |
| 2004/0183331 A1 * | 9/2004 | Yamazaki | ............ | B62D 25/142 296/72 |
| 2004/0262954 A1 * | 12/2004 | Scheib | ............ | B62D 29/004 296/193.02 |
| 2005/0253423 A1 * | 11/2005 | Wolf | ............ | B62D 29/004 296/208 |
| 2005/0285433 A1 * | 12/2005 | Baudouin | ............ | B62D 25/142 296/208 |
| 2006/0017309 A1 * | 1/2006 | Wolf | ............ | B60H 1/242 296/193.02 |
| 2006/0199492 A1 * | 9/2006 | Ozeki | ............ | B60H 1/242 454/69 |
| 2007/0006986 A1 * | 1/2007 | Derleth | ............ | B62D 25/142 162/234 |
| 2007/0052262 A1 * | 3/2007 | Wolf | ............ | B60H 1/00564 296/208 |
| 2007/0132280 A1 * | 6/2007 | Wolf | ............ | B62D 29/005 296/208 |
| 2007/0137832 A1 * | 6/2007 | Wolf | ............ | B60H 1/0055 165/42 |
| 2007/0164586 A1 * | 7/2007 | Erlingfors | ............ | B62D 25/145 296/208 |
| 2007/0245758 A1 * | 10/2007 | Binder | ............ | B62D 29/005 62/259.4 |
| 2007/0295453 A1 * | 12/2007 | Koelman | ............ | B62D 25/145 156/331.8 |
| 2008/0197669 A1 * | 8/2008 | Schleichert | ............ | B62D 25/145 296/181.1 |
| 2009/0008956 A1 * | 1/2009 | Scheib | ............ | B62D 29/001 296/70 |
| 2009/0140553 A1 * | 6/2009 | Hitz | ............ | B60H 1/242 296/208 |
| 2011/0272961 A1 * | 11/2011 | Scheib | ............ | B62D 29/005 296/72 |
| 2013/0320695 A1 * | 12/2013 | Wenzel | ............ | B29C 45/006 296/72 |
| 2014/0062136 A1 * | 3/2014 | Townson | ............ | B23K 26/24 296/191 |
| 2015/0217624 A1 * | 8/2015 | Herr-Rathke | ............ | B62D 29/005 296/193.02 |
| 2016/0207816 A1 | 7/2016 | Buchet | | |
| 2018/0093567 A1 * | 4/2018 | Motomura | ............ | G02B 27/0149 |
| 2019/0185067 A1 * | 6/2019 | Mullen | ............ | B62D 29/04 |
| 2019/0185068 A1 * | 6/2019 | Mullen | ............ | B62D 29/04 |
| 2020/0156709 A1 * | 5/2020 | Gizaw | ............ | B62D 29/00 |

FOREIGN PATENT DOCUMENTS

| | | |
|---|---|---|
| EP | 1 323 623 A1 | 7/2003 |
| EP | 2 019 026 A1 | 1/2009 |
| WO | WO 2005/085046 A1 | 9/2005 |

* cited by examiner

SELF-SUPPORTING CARRIER STRUCTURE FOR AN INSTRUMENT PANEL IN A VEHICLE, INSTRUMENT PANEL COMPRISING SUCH A CARRIER STRUCTURE AND VEHICLE WITH SUCH AN INSTRUMENT PANEL

CROSS-REFERENCES TO RELATED APPLICATIONS

This application claims the priority of European Patent Application Serial No. 18 150714.6 filed Jan. 9, 2018 pursuant to 35 U.S.C. 119(a)-(d), the subject matter of which is incorporated herein by reference.

BACKGROUND OF THE INVENTION

The present invention relates to a self-supporting carrier structure for an instrument panel in a vehicle. Furthermore, the invention is directed to an instrument panel comprising such a carrier structure and is directed to a vehicle equipped with such an instrument panel.

Nothing in the following discussion of the state of the art is to be construed as an admission of prior art.

Known instrument panels are usually mounted on a cross beam extending between the left and the right A-pillar of a given vehicle. Moreover, the cross beam is supported by vertical girders. Conventional vehicles driven by combustion engines comprise a transmission tunnel on which a gear shift is mounted. The transmission tunnel is covered by a center console dividing at least the two front passenger seats from each other. The center console may also be used to support the instrument panel and the vertical girders. Such instrument panels are disclosed in EP 2 019 026 B1.

In the pursuit of reducing the global carbon dioxide emissions the attention of car makers and suppliers is shifted to the development of vehicles driven by alternative drives. A great deal of potential to reduce carbon dioxide emissions is seen in electrically driven vehicles. The power train of electrically driven cars does not require gearboxes so transmission tunnels may be dispensed with leading to an enhanced freedom in the design of the passenger compartment. However, the freedom in the design may be limited by the need to support the instrument panel by means of the vertical girders mentioned above.

It would therefore be desirable and advantageous to provide an improved instrument panel support to obviate prior art shortcomings and to provide such a support to suit electrically driven vehicles and other applications.

SUMMARY OF THE INVENTION

According to one object of the present invention an instrument panel is presented that takes up a reduced amount of space inside the passenger compartment and reduces the limitations imposed on the freedom of design of the passenger compartment. Furthermore, an embodiment of the present invention has also the objective to provide a vehicle that includes such an instrument panel.

This object and others are solved by providing a self-supporting carrier structure for an instrument panel of a vehicle which includes a network of a plurality of hollow support elements and solid support elements arranged according to a load path analysis, with the hollow support elements forming at least one manifold used as an air duct and include at least one air inlet for introducing air into the hollow support elements and at least one air outlet for guiding the air into the passenger compartment of the vehicle.

Furthermore, the self-supporting carrier forms at least one sensor- or display receptacle for a vehicle display or at least one vehicle sensor.

The self-supporting carrier structure also forms at least one glove box receptacle for a vehicle glove box.

According to one embodiment of the present invention a self-supporting carrier structure for an instrument panel in a vehicle includes a coherent network of a plurality of hollow support elements and solid support elements arranged according to the results of a load path analysis, wherein the hollow support elements form at least one manifold used as an air duct comprising at least one air inlet for introducing air into the hollow support elements and at least one air outlet for guiding the air into the passenger compartment of a vehicle.

A load path analysis may be conducted for example by a bionic topology optimization using methods like "soft-kill-option". The resulting carrier structure provides a high rigidity at a reduced material volume. As a consequence the weight of the carrier structure so obtained is significantly lower compared to prior art instrument panels mounted on a cross beam. Due to its high rigidity the carrier structure is self-supporting and there is no need to provide vertical girders to support the carrier structure on a chassis frame or the like. Hence the carrier structure and thus the instrument panel may be mounted between two A-pillars of a given vehicle without taking up space below the instrument panel, i.e. the legroom of the passenger compartment. The available space inside the passenger compartment is increased. In particular in electrically driven cars a center console for covering the transmission tunnel is not needed. The self-supporting structure thus allows for a passenger compartment in which the legroom in the front of the passenger compartment is not limited by girders or the like.

However, load path analyses conducted as described above result in solid support elements. To provide a self-supporting carrier structure according to the present embodiment respective boundary conditions have to be defined. These boundary conditions may include the identification of support elements that should be hollow for forming the manifold and areas of the carrier structure which should be connected by hollow support elements. Having defined the boundary conditions a second load path analysis is conducted based on the carrier structure obtained by the first load path analysis. The carrier structure obtained by the second load path analysis considering these boundary conditions comprises hollow and solid support elements. The hollow support elements are used as a manifold for guiding air through the carrier structure and into the passenger compartment. There is no need to mount a tubing system inside the instrument panel which would lead to a more complex assembly and to an increased weight. The self-supporting carrier structure here presented thus provides a high rigidity, a low weight and an easy assembly.

In one alternative of the carrier structure here presented the hollow support elements and the solid support elements form a coherent network. The support elements do not need to be fastened to each other and no connection joints are formed. Connection joints are often the cause for malfunctions of the carrier structure, a danger significantly reduced by the presented carrier structure. The coherent network may be produced by additive manufacturing processes like 3D-printing.

According to another alternative the network may only be partly coherent and may comprise a number of separate hollow support elements and solid support elements that are joined to each other e.g. by welding or bonding. In this alternative conventional production processes like injection molding, extrusion or blow molding may likewise be employed.

According to one embodiment of the self-supporting carrier structure at least one of the hollow support elements forms a single outlet nozzle. By using in particular additive manufacturing processes even relatively complex structures like outlet nozzles may be formed thereby superseding the necessity to connect external nozzle units to the hollow support elements. The production process is facilitated.

In a further embodiment of the self-supporting carrier structure at least two hollow support elements form a common out-let nozzle. The outlet nozzle may extend over a significant part of the carrier structure allowing a uniform air infeed into the passenger compartment.

In accordance with another embodiment at least one external nozzle unit is connected to one or more hollow support elements. As already explained the use of additive manufacturing processes allows for forming outlet nozzles integrated into the carrier structure. However, in some cases additional functions in particular regarding the control of the air flow leaving the outlet nozzle shall be provided. In this case nozzle units consisting of one or more movable parts may be employed which cannot or only partly be produced by additive manufacturing processes. In this case the external nozzle units providing the requested functions are connected to one or more of the hollow support elements. Moreover, already existing external nozzle units may be used and connected to the hollow support elements. Decorative elements or decorative strips may also be connected to the carrier structure to provide the instrument panel with a pleasant optical appearance.

In a further embodiment at least one hollow support element comprises a shaping section matching with the external nozzle unit. Usually the hollow support element forms a plane opening into which the external nozzle unit may be introduced. In contrast to that in this embodiment the hollow support element comprises a shaping section that may e.g. form the lower half of an outlet nozzle while the external nozzle unit forms the upper half of the outlet nozzle. The connection of the external nozzle unit with the hollow structure is facilitated. Moreover, the outlet nozzle may be better integrated into the load path.

In another embodiment the carrier structure forms at least one mechanical connection section for connecting the carrier structure with neighboring construction elements of the vehicle. The assembly of the carrier structure is facilitated as no additional fastening sections are needed.

According to another embodiment the carrier structure forms at least one steering column bearing section for bearing a steering column on the carrier structure. As the carrier structure provides integrated bearing sections for the steering column the assembly of the steering column can be conducted in a fast and easy manner. The number of parts needed for bearing the steering column can significantly be reduced. A steering wheel may be mounted on the steering column. Instead of a steering column a steer-by-wire system may be mounted on the steering column bearing section.

In a further embodiment the carrier structure forms at least one head-up display mounting section for mounting a head-up display on the carrier structure. The mounting of a head-up display is facilitated.

According to another embodiment the carrier structure forms at least one airbag mounting section for mounting an airbag module on the carrier structure. The mounting of an airbag module is facilitated.

In a further embodiment the carrier structure forms at least one chute channel for an airbag of the vehicle. In known instrument panels chute channels are often manufactured by injection molding. However, chute channels may lead to material accumulation and thus prolonged cooling times resulting in deficiencies in the optical appearance of the instrument panel. As the chute channels form an integrated part of the presented carrier structure such problems are omitted.

According to another embodiment the carrier structure forms at least one sensor- or display receptacle for a vehicle display or a vehicle sensor. The mounting of sensors and displays is facilitated.

Another embodiment of the carrier structure is characterized in that the carrier structure forms or comprises a guide section for guiding air to the head-up display mounting section, the sensor- or display receptacle and/or to any electric or electronic component mounted on the carrier structure. Next to the head-up display, sensors or other displays electric or electronical components may be cameras, interactive surface elements or similar components. Interactive surface elements may be used for controlling the air condition, the sound system, the electric seat adjustment or the like.

With advancing digitalization the number of displays and electric or electronic components inside a vehicle is increasing. However, in operation the electric components and displays produce heat that needs to be dissipated to avoid overheating. Moreover, the operation of the components and displays may lead to an undesirable increase in temperature of the passenger compartment. The carrier structure can be formed such that it forms guide sections guiding a part of the air flowing through the hollow support elements to the surroundings of the displays and electric or electronic components. As displays are visible from the passenger compartment the air is guided to their backside. In any case the heat produced by the display is dissipated.

Depending on the temperature conditions it may be sufficient just to provide an air flow in the surroundings of the displays and components to avoid heat accumulation. In case an active cooling is needed the air condition of the vehicle may provide the air of the required temperature. In other cases it may be necessary to heat the air guided to the displays or components to avoid the formation of moisture condensing on the displays or components. Also in this case the air condition may provide the air having the required properties. It is thus not necessary to install a separate cooling or heating unit inside the carrier structure. Moreover, the additional design effort for the guide section is limited. Complex structures as shown in US 2004/0074248 A1 are not needed.

In a further embodiment the carrier structure forms at least one glove box receptacle for a vehicle glove box. The mounting of the glove box is facilitated.

Another example of the invention is directed to an instrument panel in a vehicle, comprising a self-supporting carrier structure according to one of the embodiments previously presented, and a cover layer covering the carrier structure. The cover layer may be produced by injection molding.

The technical effects and advantages as discussed with regard to the present method equally apply to the instrument panel. Briefly, the presented instrument panel possesses a high rigidity, a low weight and may be assembled in an easy way. Due to the fact that receptacles and mounting sections for vehicle devices like sensors, displays and glove boxes may be integrated into the carrier structure and thus into the instrument panel the amount of parts is reduced compared to known instrument panels. The reduction of the number of parts not only leads to a facilitated assembly and to a reduced weight but also reduces the complexity of the logistics of the manufacturing and assembly. Moreover the presented instrument panel allows for new design concepts of passenger compartments as no vertical girders or the like for supporting the instrument panel are needed.

An implementation of the present invention is directed to a vehicle comprising a first A-pillar and a second A-pillar, a partition wall limiting the passenger compartment to a front compartment of the vehicle, and an instrument panel according to the example presented above, fastened to the first A-pillar and the second A-pillar and the partition wall. The technical effects and advantages as discussed with regard to the present method equally apply to the vehicle. Next to the facilitated assembly the reduced weight contributes to the pursued reduction of the energy consumption of the vehicle. Moreover, the presented instrument panel allows for new design concepts of passenger compartments.

According to a further implementation the partition wall comprises a connecting plate connected to the carrier structure and providing a fluid communication between the front compartment and the air inlet. The connecting plate covers two functions, namely the mechanical connection for the force transmission between the instrument panel and the partition wall and thus the vehicle chassis and the airtight connection between the hollow support elements and the partition wall. In the front compartment an air conditioner may be installed providing air of desired temperature and humidity. The air conditioner may be connected to the other side of the connecting plate by means of a tubing.

BRIEF DESCRIPTION OF THE DRAWING

The present invention is described in detail with reference to the drawings attached wherein Throughout all the Figures, same or corresponding elements are generally indicated by same reference numerals.

DETAILED DESCRIPTION OF PREFERRED EMBODIMENTS

Figure 1:
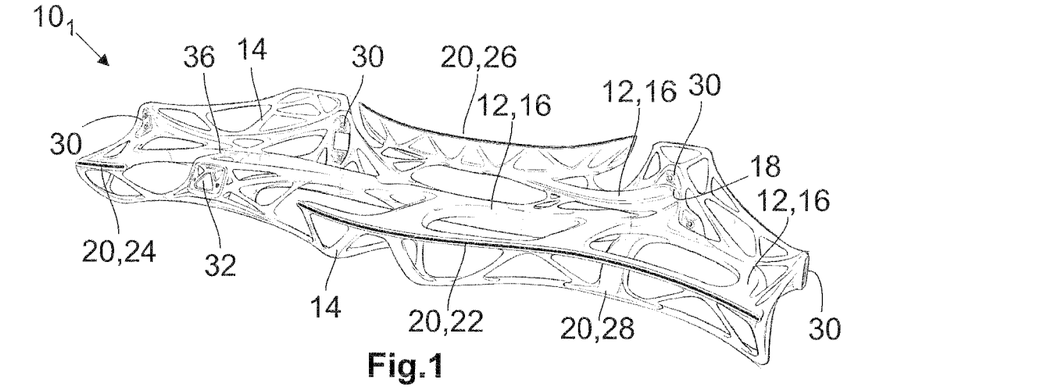
FIG. 1 shows a perspective view of a first embodiment of an inventive carrier structure.

FIG. 1 shows a perspective view of a first embodiment of an inventive self-supporting carrier structure $10_1$. The carrier structure $10_1$ comprises a coherent network of a plurality of hollow support elements 12 and solid support elements 14. The hollow support elements 12 and the solid support elements 14 are arranged according to the results of a load path analysis conducted for example by a bionic topology optimization using methods like "soft-kill-option". The resulting carrier structure $10_1$ has a skeleton-like and complex geometry. The manufacturing of the carrier structure $10_1$ may therefore include the use of additive production processes. Other conventional production processes like injection molding, extrusion or blow molding may likewise be employed.

The hollow support elements 12 form a manifold 16 comprising a number of air inlets 18 and a number of air outlets 20. The manifold 16 is used as an air duct to guide the air through the carrier structure $10_1$. As evident from FIG. 1, three hollow support elements 12 form a common outlet nozzle 22 that extends approximately over half of the width of the carrier structure $10_1$. One of the hollow support elements 12 forms a single outlet nozzle 24 that is significantly smaller compared to the common outlet nozzle 22. Another hollow support element 12 forms a defrost outlet nozzle 26 directed to a windscreen of a given vehicle 27 (see FIG. 6). Additionally, yet another hollow support element 12 forms a legroom outlet nozzle 28 directed to the legroom of a given vehicle 27.

Figure 3:
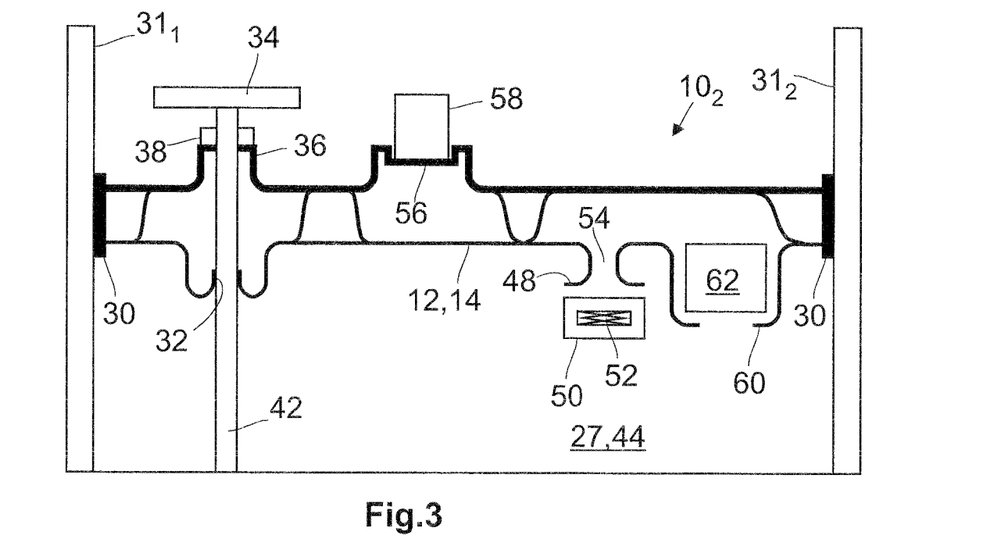
FIG. 3 shows a schematic sketch of a second embodiment of the inventive carrier structure.
Figure 6:
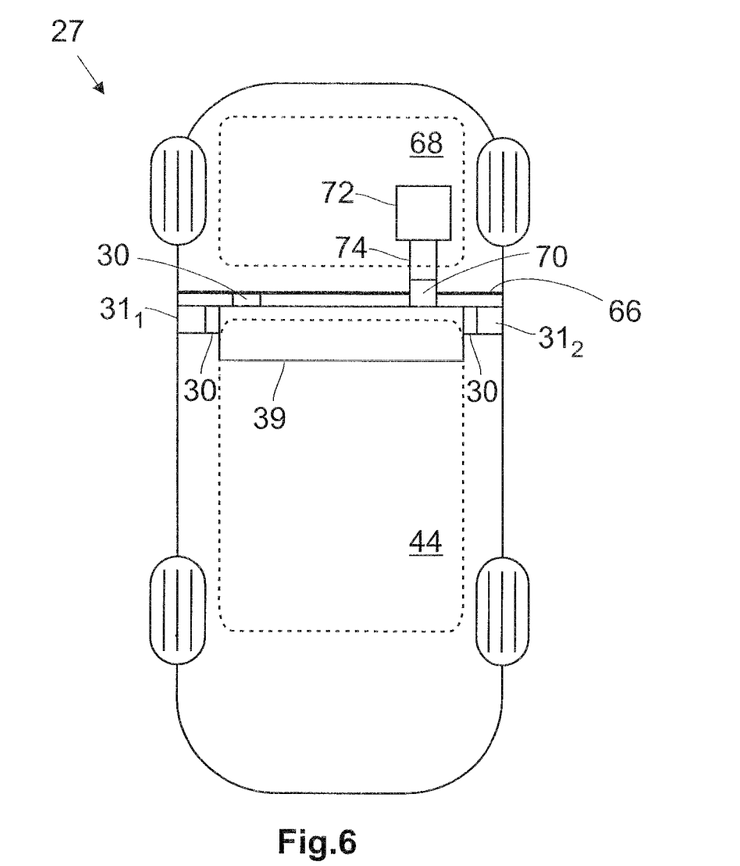
FIG. 6 is a schematic sketch of a vehicle equipped with the inventive instrument panel.

The carrier structure $10_1$ forms a plurality of mechanical connection section 30 for connecting the carrier structure $10_1$ with neighboring construction elements, e.g. with a first A-pillar $31_1$ and a second A-pillar $31_2$ of a vehicle 27 (see FIGS. 3 and 6). Moreover, the carrier structure $10_1$ forms a steering column mounting section 32 for mounting a steering column 42 (see FIG. 3) on the carrier structure $10_1$. A steering wheel 34 may be connected to the steering column 42. Beyond that, the carrier structure $10_1$ forms a head-up display mounting section 36 for mounting a head-up display 38 on the carrier structure $10_1$.

Figure 2:
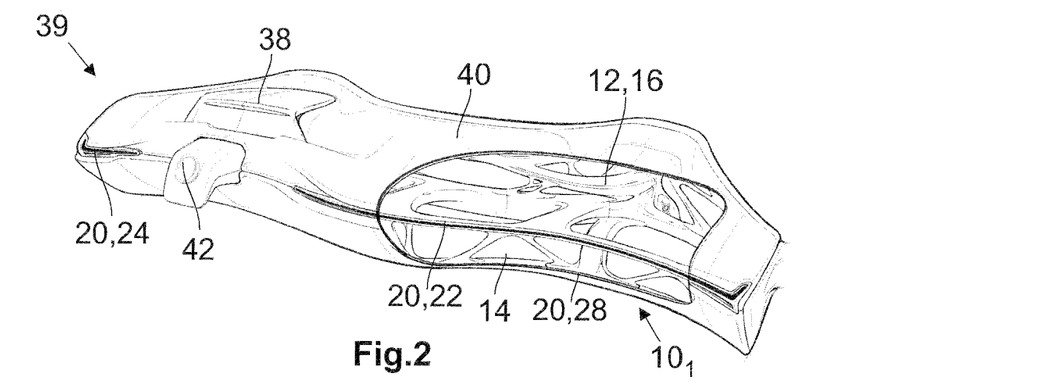
FIG. 2 shows a perspective view of an inventive instrument panel comprising the carrier structure of FIG. 1.

FIG. 2 shows an instrument panel 39 comprising the carrier structure $10_1$ of FIG. 1. The instrument panel 39 comprises a cover layer 40 that covers the carrier structure $10_1$. The cover layer 40 may be an integral part of the carrier structure $10_1$ and also contribute to the load bearing capacity of the instrument panel 39. Alternatively the cover layer 40 may be a separate unit that may be produced by injection molding and being fiber-reinforced. The cover layer 40 may as an example also be produced by grouting of fiber-reinforced thermoplastic mats, e.g., made of natural fiber enforced polypropylene (NFPP).

FIG. 2 also shows the head-up display 38 and a steering column 42 to which the steering wheel 34 may be mounted (see FIG. 3).

FIG. 3 shows a principle sectional sketch through a second embodiment of the inventive carrier structure $10_2$ mounted in a passenger compartment 44 of a vehicle 27. For the sake of clarity no distinction is made between solid support elements 14 and hollow support elements 16. The carrier structure $10_2$ according to the second embodiment also comprises the steering column bearing section 32 for bearing a steering column 42 on the carrier structure $10_2$. Moreover, the carrier structure $10_2$ forms at least one airbag mounting section 48 for mounting an airbag module 50 on the carrier structure $10_2$. The airbag module 50 carries a folded airbag 52 and the units necessary to release the airbag 52. In the event the airbag 52 is released the airbag is guided by a chute channel 54 also formed by the carrier structure $10_2$. Beyond that the carrier structure $10_2$ forms at least one sensor- or display receptacle 56 for a vehicle display 58 or a vehicle sensor. The vehicle display 58 may be the display of a navigation system and/or of a vehicle control center. The receptacles 56 may also be designed for goods the driver wants to deposit on the instrument panel 39, e.g. a beverage can or the like. The carrier structure 10$_2$ also forms at least one glove box receptacle 60 for a vehicle glove box 62.

It is apparent from FIG. 3 that the instrument panel 39 is fastened to the two A-pillars 31$_1$, 31$_2$ by means of the mechanical connection sections 30. The legroom of the passenger compartment 44 below the instrument panel 39 is not limited by girders or the like.

Figure 4A:
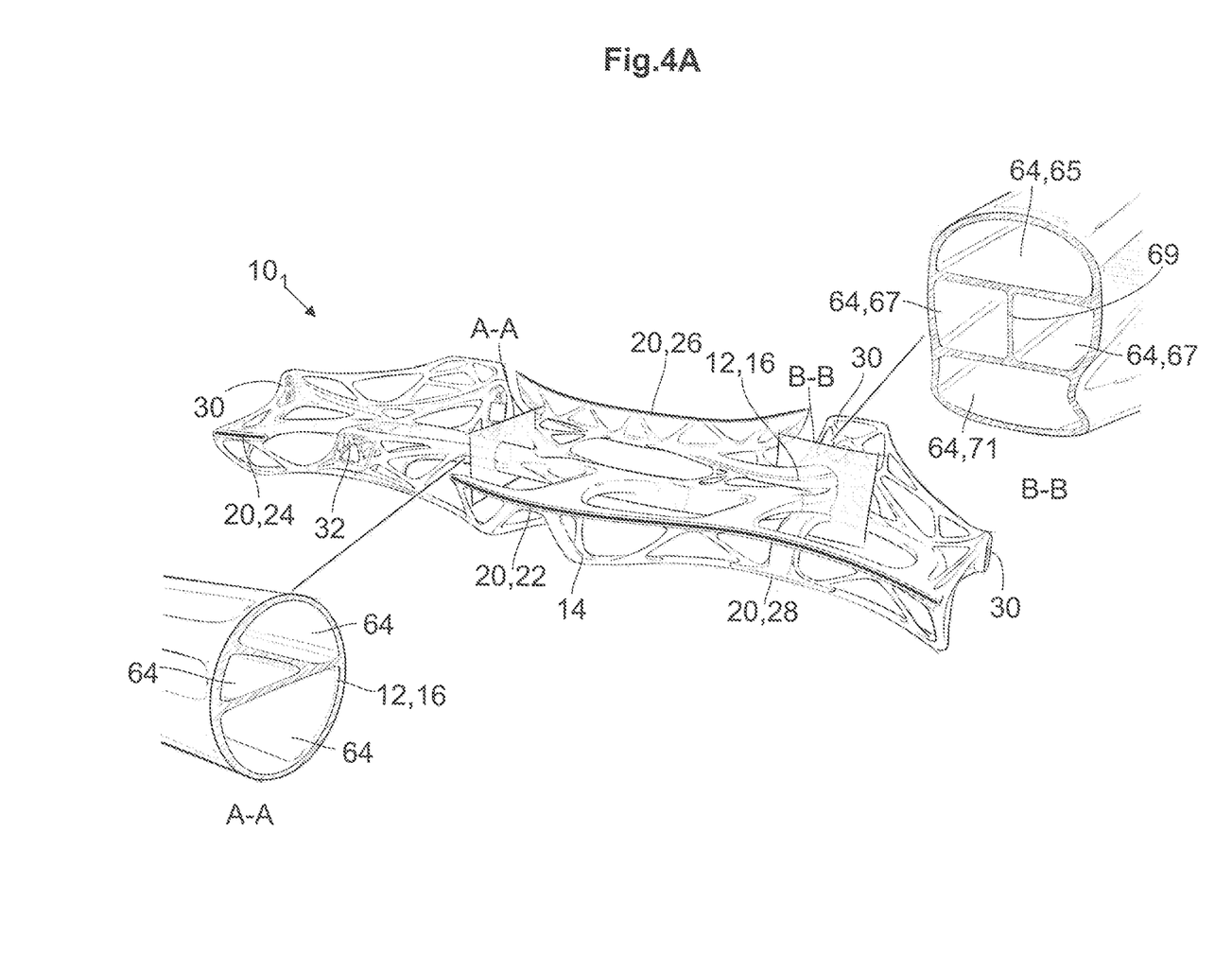
FIG. 4A shows the carrier structure of FIG. 1 and enlarged sections of hollow support elements.

In FIG. 4A sectional views through the hollow support elements 12 of the carrier structure 10$_1$ according to FIG. 1 along the section planes A-A and B-B are shown. The sectional views demonstrate that a hollow support element 12 may comprise a plurality of channels 64 for guiding the air throughout the carrier structure 10$_1$. Referring to sectional view B-B the hollow support element 12 comprised in total four channels 64. An upper channel 65 is connected to the defrost outlet nozzle 26 whereas the two middle channels 67 are connected to the common outlet nozzle 22 and the single nozzle 24, the two middle channels 67 separated by a separating wall 69. A lower channel 71 is connected to the legroom outlet nozzle 28. Regarding the two middle channels 67 the separating wall 69 may primarily have a stiffening effect on the carrier structure 10$_1$ so that equally conditioned air may be guided through the two middle channels to the same outlet nozzles 22, 24.

Figure 4B:
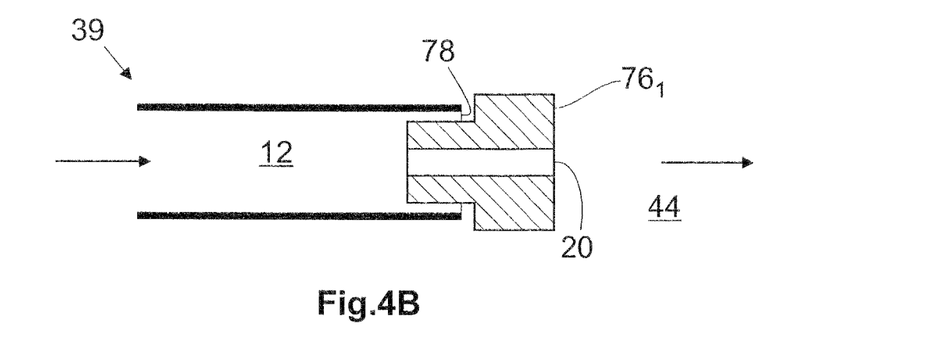
FIG. 4B shows a schematic sketch of a first embodiment of an external nozzle unit connected to a hollow support element.

As shown in FIG. 4B an external nozzle unit 76$_1$ according to a first embodiment is connected to at least one of the hollow support elements 12. The external nozzle unit 76$_1$ may be equipped with air baffles (see FIG. 4B) to regulate the amount of air introduced into the passenger compartment 44 and its direction by which the air is entering the passenger compartment 44. The hollow support element 12 forms a plane opening 78 into which the external nozzle unit 76$_1$ is introduced for connection with the hollow support element 12.

Figure 4C:
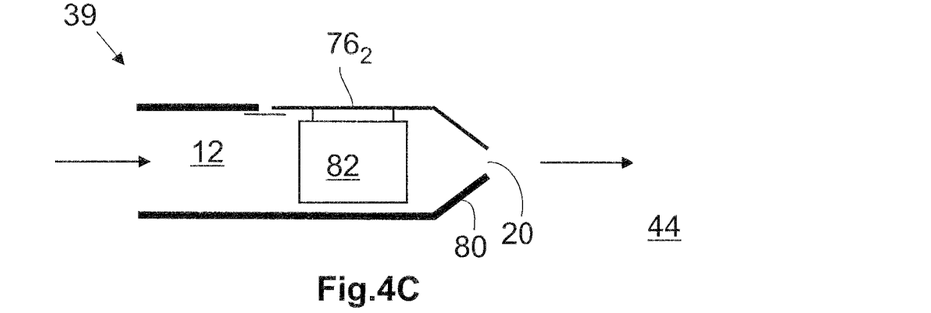
FIG. 4C shows a schematic sketch of a second embodiment of an external nozzle unit connected to a hollow support element.

In FIG. 4C an external nozzle unit 76$_2$ according to a second embodiment is connected to the hollow support element 12. Instead of a plane opening 78 the hollow support element 12 forms a shaping section 80 that is formed like a half shell. The external nozzle unit 76$_1$ is mounted on the shaping section 80. The external nozzle unit 76$_1$ comprises air baffles 82 or other means to guide and regulate the air flow. The shaping section 80 and the external nozzle unit 76$_2$ together form an air outlet 20 through which the air can be introduced into the passenger compartment 44.

Figure 5:
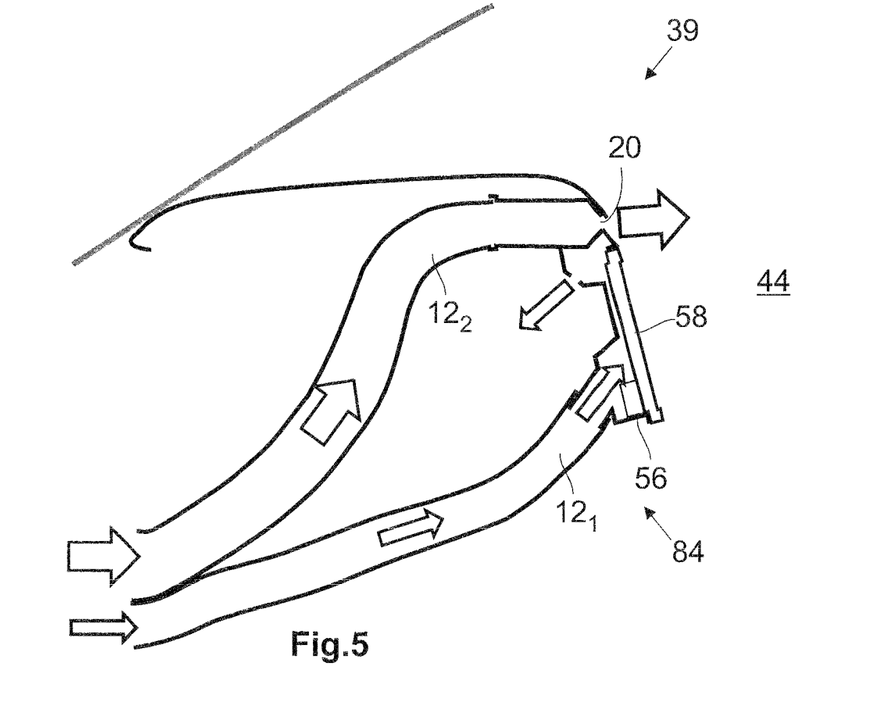
FIG. 5 is a schematic sketch of a guide section for guiding air to an electrical or electronical component mounted on the carrier structure.

In FIG. 5 a guide section 84 formed by the carrier structure 10 is shown. As already mentioned the carrier structure 10 forms at least one sensor- or display receptacle 56 in this case for the vehicle display 58. At least one of the hollow support members 12$_1$ is arranged to guide air to the backside of the vehicle display 58. The heat produced during the operation of the vehicle display 58 is dissipated by the air flowing along the backside of the vehicle display 58. In the shown embodiment the air that has absorbed the heat is guided back into hollow spaces of the instrument panel 39. FIG. 5 further shows a further hollow support 12$_2$ member that forms an air outlet 20. The hollow support member 12$_1$ may branch off from the further support element 12$_2$. By means of a further baffle or similar means the amount of air guided to the vehicle display 58 may be kept constant irrespective of the amount of air introduced into the passenger compartment 44 via the air outlet 20.

Of course air may be guided to electric or electronic components other than displays, e.g., to cameras, sensors or interactive surface elements. Their common feature is that they produce heat in operation that needs to be dissipated to avoid heat accumulation that may lead to mal-functioning. In some cases it may be necessary to provide heated air to avoid the condensation of moisture on the components. In this case the air is conditioned accordingly.

In an embodiment not shown the air having absorbed the heat produced by the vehicle display 58 may be introduced e.g. into the hollow support element 12$_2$ shown in FIG. 5 that forms one of the air outlets 20. The heat produced by the vehicle display 58 can be used to heat the passenger compartment 44. However, a control unit may be employed that makes sure that the air having absorbed the heat produced by the vehicle display 58 is only introduced into the hollow support element 12$_2$ in case the temperature of the passenger compartment 44 should be increased. If not the air having absorbed the heat of the vehicle display 58 may be guided to the surroundings of the vehicle 27.

FIG. 6 shows a schematic sketch of a vehicle 27 equipped with the inventive instrument panel 39. It is clearly recognizable that the instrument panel 39 is not only fastened to the two A-pillars 31$_1$, 31$_2$ of the vehicle 27 but also to a partition wall 66 that separates the passenger compartment 44 from a front compartment 68, e.g. an engine compartment. As is the case with the A-pillars 31$_1$, 31$_2$ the instrument panel 39 is fastened to the partition wall 66 by means of the mechanical connection sections 30. The partition wall 66 is designed to absorb the forces imposed by the instrument panel 39. In the partition wall 66 a connecting plate 70 is arranged that is connected to the carrier structure 10$_1$. The connecting plate 70 provides a fluid communication between the front compartment 68 and the air inlet 18 of the manifold 16. An air conditioner 72 is located in the front compartment 68 that provides air conditioned according to the passengers' request. The air conditioner 72 is connected to the connecting plate by a tubing 74.

Figure 7:
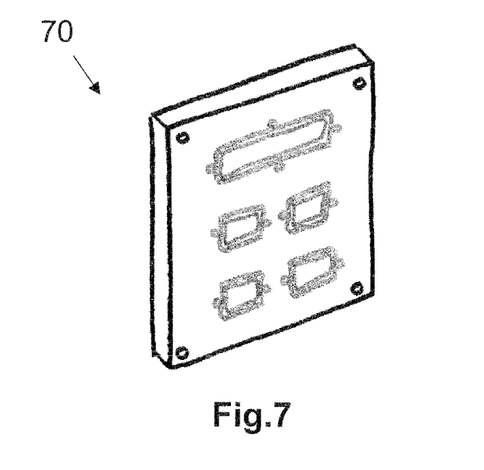
FIG. 7 shows an enlarged perspective view of a connecting plate.

FIG. 7 shows an enlarged perspective view of the connecting plate 70.

While the invention has been illustrated and described as embodied in, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A self-supporting carrier structure for an instrument panel in a vehicle, comprising,
    a network of a plurality of hollow support elements and solid support elements arranged according to a load path analysis,
    wherein the hollow support elements form at least one manifold used as an air duct comprising at least one air inlet for introducing air into the hollow support elements and at least one air outlet for guiding the air into a passenger compartment of the vehicle.

2. The self-supporting carrier structure according to claim 1, wherein at least one of the hollow support elements forms a single outlet nozzle.

3. The self-supporting carrier structure according to claim 1, wherein at least two hollow support elements form a common outlet nozzle.

4. The self-supporting carrier structure according to claim 3, wherein at least one external nozzle unit is connected to one or more hollow support elements.

5. The self-supporting carrier structure according to claim 4, wherein at least one hollow support element comprises a shaping section matching with the external nozzle unit.

6. The self-supporting carrier structure according to claim 1, wherein the carrier structure forms at least one mechanical connection section for connecting the carrier structure with neighboring construction elements of the vehicle.

7. The self-supporting carrier structure according to claim 1, wherein the carrier structure forms at least one steering column bearing section for bearing a steering column on the carrier structure.

8. The self-supporting carrier structure according to claim 1, wherein the carrier structure forms at least one head-up display mounting section for mounting a head-up display on the carrier structure.

9. The self-supporting carrier structure according to claim 1, wherein the carrier structure forms at least one airbag mounting section for mounting an airbag on the carrier structure.

10. The self-supporting carrier structure according to claim 9, wherein the carrier structure forms at least one chute channel for an airbag of the vehicle.

11. The self-supporting carrier structure according to claim 1, wherein the carrier structure forms at least one sensor- or display receptacle for at least one vehicle display or at least one vehicle sensor.

12. The self-supporting carrier structure according to claim 11, wherein the carrier structure forms a guide section for guiding air to the head-up display mounting section, the sensor- or display receptacle and/or to any electric component mounted on the carrier structure.

13. The self-supporting carrier structure according to claim 1, wherein the carrier structure forms at least one glove box receptacle for a vehicle glove box.

14. An instrument panel in a vehicle, comprising,
a self-supporting carrier structure according to claim 1, and
a cover layer covering the carrier structure.

15. A vehicle, comprising,
a first A-pillar and a second A-pillar,
a partition wall separating the passenger compartment from a front compartment of the vehicle, and
an instrument panel according to claim 14 fastened to the first A-pillar and the second A-pillar and the partition wall.

16. The vehicle according to claim 15, wherein the partition wall comprises a connecting plate connected to the carrier structure and providing a fluid communication between the front compartment and the air inlet.

* * * * *